Patented Feb. 16, 1954

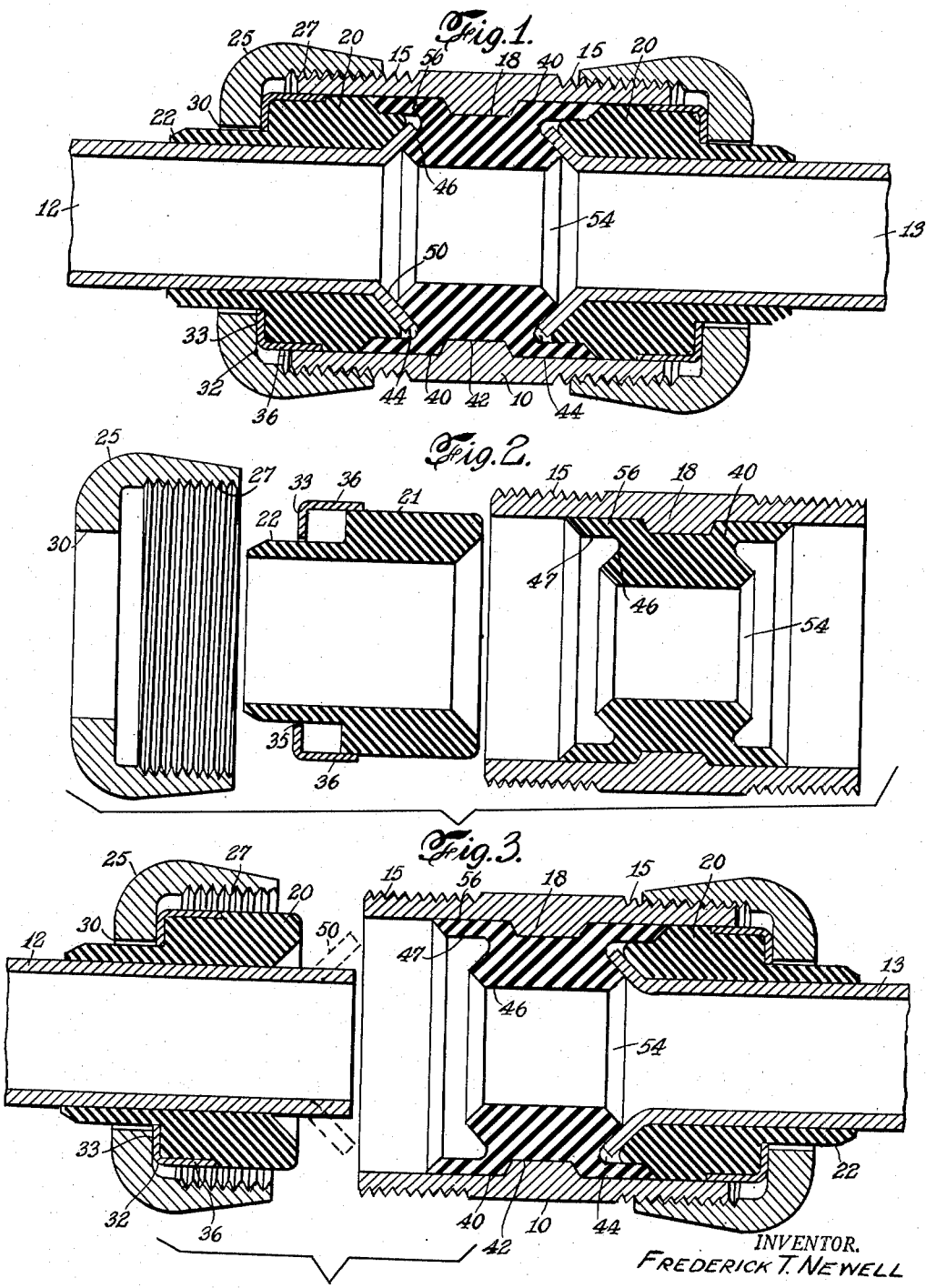

2,669,465

UNITED STATES PATENT OFFICE 2,669,465

INSULATING COUPLING

Frederick T. Newell, Bradford, Pa., assignor to Dresser Industries, Inc., Dallas, Tex., a corporation of Pennsylvania Application August 5, 1950, Serial No. 177,820

8 Claims. (Cl. 285—16)

This invention relates to insulating couplings for connecting sections of tubing and is more particularly concerned with insulating lock couplings for forming a flexible fluid-tight joint between sections of tubing made from aluminum, copper and metals of like malleability.

Metal pipes and tubing laid underground tend, by reason of their lower electrical resistance with respect to the soil, to pick up electric currents emanating from a variety of sources such as street car tracks, industrial power grounds, induced currents from parallel lines, chemical action of the soil and the like. When the current is permitted to flow along a line unimpeded, serious damage to the line by electrolytic action frequently results. Furthermore, when two tubes of dissimilar metal, for example, copper and aluminum are joined, or when copper or aluminum tubes are joined by a steel or castiron coupling, the resulting galvanic action and corrosion may eventually cause failure of the tubing. A major practical problem in the construction of tubing lines is consequently the adequate protection of the lines from damage by electrolytic action. It is of great practical importance to reduce to a minimum the need for repair or replacement of one or more sections of the lines since such maintenance is expensive and time-consuming and necessitates costly interruptions in service.

To avoid this deleterious electrolytic or galvanic action by preventing the conduction of electric currents through the line and preventing electrically conductive contact between the sections of the line, it has been proposed to insulate each joint, as by insulating the coupling from one or both of the adjacent tube sections. Thus, in installations involving so-called compression couplings, it has been proposed to enclose the end of one of the tube sections by a sleeve of the same rubbery composition used to form the gasket of the coupling. In some instances the rubber sleeve has been made integral with the gasket.

While such construction is generally adequate under ordinary conditions, when the line is subjected to considerable axial stresses contact between the two abutting tube sections or between one or both of the tube sections and the coupling may occur owing to undue outward or inward axial movement of the tubes with respect to the coupling.

It has also been proposed to insulate the coupling from the tube by a member formed of sheet metal coated with insulating enamel. Since, however, the sheet metal body of such a member is not of insulating material, any failure of the enamel coating completely nullifies the effectiveness of such a member as an insulator. In service the severe stresses to which the coupling is frequently subjected cause chipping of the enamel and consequent exposure of the bare metal of the insulating member. Furthermore, while such metal insulating sleeves are effective in preventing direct contact between the ends of the abutting tube sections, they do not provide effective means for preventing contact between the tube sections and the coupling upon outward axial movement of the tubes.

The heretofore proposed insulating couplings have not, moreover, been of the locking type, i. e. they are not effective to insure against outward axial movement of the tubes with respect to the coupling, which in some cases may actually result in a complete separation of the tube sections from the coupling. In vertical tube arrangements where, for example, a tube line may extend for 100 to 200 ft. vertically or at an acute angle, the couplings which hold together the many sections of tube which are required to make up such lines, must not only provide a fluid-tight joint between each tube section but must also resist the longitudinal stresses exerted by weight of the tube sections. The longer the tubing line, of course, the greater the stress. It is in this type of installation in particular that prior insulating couplings have not been entirely satisfactory. Difficulty has also been experienced with prior insulating coupling in industrial installations which are subjected to considerable vibration and flexing. Such vibration and flexing has in many cases resulted in sufficient movement of the tubing within the coupling that metal to metal contact has resulted.

It is an object of the present invention to provide an insulating coupling for tubing which avoids the deficiencies of the insulating couplings heretofore known.

It is another object of the invention to provide an insulating lock coupling.

It is a further object of the invention to provide a coupling of the character indicated which is of relatively simple construction.

It is another object of the invention to provide an insulating lock coupling which may be applied rapidly and easily without skilled labor.

It is another object of the invention to provide an insulating coupling for tubing which permits substantial vibration and flexing of the tubing without loss of effectiveness.

According to the invention I provide a coupling for joining tube sections in locking, fluid-tight and electrically insulating relationship, which comprises a tubular coupling sleeve, a gasket, insulating sleeve extensions, preferably integral with the gasket, means for urging the gasket into sealing engagement with the tubing, and an insulating annular member for receiving and shielding the flared ends of the tubing sections to effectively prevent any possible direct contact between the tube sections or between the tube sections and the coupling sleeve.

The annular insulating member is formed with tapered annular recesses to receive the flared tubing ends and the gasket compressing means are constructed to prevent withdrawal of the flared tubing from the coupling.

Other objects and features of the invention will be apparent from the following detailed description and from the drawings in which, Fig. 1 is a longitudinal sectional view of a coupling embodying features of the invention;

Fig. 2 is an exploded view in section showing in detail the component parts of the coupling; and Fig. 3 is a similar view showing the method of applying the coupling to the tubing.

Referring to the drawings, the numeral 10 designates the tubular sleeve or "middle ring" of the coupling in which the ends of tube sections 12 are received. The sleeve 10, which may be of steel, cast iron, brass or other metal, is formed with threaded ends 15 and has an inwardly extending annular rib 18 positioned approximately in the center of the sleeve. While, as in the embodiment shown in the drawings, the rib 18 preferably has a substantially trapezoidal cross-section, it may have other forms and it may, for example, be of square, rectangular or triangular cross-section. The rib 18 is advantageously made integral with the body of sleeve 10, as by casting or machining.

Fluid-tight sealing engagement between the coupling and the ends of tubes 12 is effected by compression of a gasket 20 which, in the embodiment illustrated, is annular in form and is shaped to provide a main body portion 21 which is received in the end of middle ring 10 and a sleeve section 22 which is of substantially lesser radial thickness than the body 21 and is adapted to extend outwardly along the tube surface beyond the ends of the coupling. While in the preferred embodiment of my invention I thus form the gasket with an integral sleeve, the sleeve and the gasket may be formed separately. The gasket 20 and the sleeve are formed from rubber or rubber composition, this term being used generically to include natural and synthetic rubbers and other elastomeric compounds, or compositions having like properties and characteristics. The material is relatively firm and solid but sufficiently resilient and elastic to flow under pressure to conform to the surfaces between which it is confined.

Each gasket 20 is compressed and urged into sealing engagement with tube section 12 by means of a follower nut 25, which is provided with internal threads 27 for engagement with the threaded ends 15 of coupling sleeve or middle ring 10. The follower nut 25 is formed with a tube aperture 30 which is of sufficiently large diameter to receive the tube 12 and the gasket sleeve portion 22. In order to confine and protect the gasket 20 and to prevent frictional resistance by the gasket when the follower nut 25 is rotated in tightening or loosening the coupling, there are provided suitable gasket follower means. In the embodiment shown in Fig. 1, the gasket follower takes the form of a cup-shaped annular member 32 conveniently stamped or otherwise formed from a metal sheet to define a body portion 33 formed with an aperture 35 sufficiently large to receive tube 12 and sleeve 22 and a peripheral flange 36 which is dimensioned to be received in the threaded end of coupling sleeve 10.

Positioned within sleeve 10 is an annular insulating member 40 which is shaped to conform to the inner surface of the central portion of coupling sleeve 10 and to receive the flared ends of tube sections 12. The insulating member 40 is formed from a resilient, non-frangible material which is, however, relatively resistant to deformation. The member 40 is advantageously formed from a synthetic elastomeric compound or composition such as neoprene (polychloroprene) or other compounds or compositions having like properties and characteristics. The insulating member 40 is thus formed from a material which is substantially more resistant to deformation than the material used in forming the gasket 20.

As previously mentioned, the insulating member 40 is shaped to conform to the internal surface of coupling sleeve 10 and to receive the flared ends of the tube sections 12. Thus, in the embodiment shown in Fig. 1, the annular member 40 is formed with an annular trapezoidal recess 42 shaped to receive the rib 18 and is formed with axial recesses 44 having an inwardly tapered wall 46 inclined at an angle of about 45° from the axis of member 40, and a wall 47 substantially parallel to the axis. As shown in Fig. 1, when the coupling has been applied, the flared ends 50 of tube sections 12 rest against the tapered surface 46 and are effectively captured and separated from the surface of coupling sleeve 10 by member 40. The member 40 is formed with a central aperture 54 of substantially the same diameter as the internal diameter of tube 12 so as to permit unrestricted flow through the coupling.

It will be observed that the annular insulating member 40 has a substantially trapezoidal cross-section interrupted by the axial recesses 44, the outer walls 47 of which define extensions 56 which lie along the inner surface of middle ring 10 on each side of rib 18. The outer ends of these extensions 56 define gasket recesses limiting the inward axial movement of the gaskets 20 during application of the coupling. The member 40 may be formed as an integral ring and slipped over the rib 18 when member 40 is formed from neoprene or material of like resiliency. When a less resilient material is used the member 40 may be split or formed from two or more sections to permit ready installation in sleeve 10.

Referring to Fig. 3, the coupling is easily and rapidly applied to the tubing by slipping the gasket 20, the follower nut 25 and the follower 32 over the end of one of the tubes 12. The tube is flared by any convenient means, using conventional flaring tools, and the coupling sleeve 10 is then applied over the flared tube end 50 to bring it into engagement with tapered surface 46 of annular member 40. The follower nut 25 is then tightened upon sleeve 10 until gasket 20 has been compressed into fluid-tight sealing engagement with tube 12. The coupling is applied to the abutting tube section in the same manner, and the two tube sections are thus joined in flexible, fluid-tight, non-conducting relationship. In the event of inward axial stress the flared ends 50 of tubes 12 will be forced against tapered surface 46 into recess 44 but by reason of the interposition of annular member 40 and its axial extensions 50, the flared ends 46 are at all times prevented from interengagement and from engagement with the walls of sleeve 10. Upon outward longitudinal stress on the tubes the flared ends may be drawn toward follower nuts 25 but such movement of the tubes 12 will be forcefully resisted by the gaskets 20 which will, by such movement, be further compressed, and in any event the flared ends 50 will not be able to pass through the aperture 30 in follower nuts 25 unless the stress is so great that actual rupture of the tube occurs. The joint between the tube sections 12 is, however, a flexible one by reason of the resiliency of annual member 40 and gasket 20 so that flexing and vibration are absorbed and the fluid-tightness and insulating effectiveness of the joint maintained at all times. The insulating sleeve portion 22 of gasket 20, as will be apparent from the drawings, prevents electrically conductive contact between the tube 12 and the follower nut 25 and also absorbs some of the bending stress which may be applied to the line.

I thus provide an insulating lock coupling for tubing which effectively insulates the tubing sections and forms an insulating lock joint resistant to disengagement by inward or outward longitudinal stress on the tube sections, so that the coupling is effective in joining the sections of a vertical tube line.

It will be apparent that my insulating lock coupling may be made in sizes to fit any of the standard sizes of tubing commonly used in making tube lines and is of particular utility for tubes in sizes ranging from ¼ inch to two inches.

It will also be apparent that my coupling may be used to join the sections of any tubing which may be flared and that the various components of my insulating coupling may differ from the embodiment shown in the drawing.

It will be understood that various other changes and modifications may be made without departing from the scope of the invention as defined in the appended claims, and it is intended, therefore, that all matter contained in the drawings and in the foregoing description shall be interpreted as illustrative and not in a limiting sense.

What I claim and desire to secure by Letters Patent is:

1. An insulating lock coupling for unthreaded tubing and the like comprising, in combination, a tubular sleeve having ends defining tube apertures, a central annular rib extending inwardly from the walls of said sleeve, the walls of said sleeve between said rib and said tube apertures being substantially cylindrical, an annular insulating member positioned in said sleeve and enclosing said rib, said member being formed with an annular recess for reception of said rib and with a recess for receiving and enclosing the end of said tubing, resilient gasket means in the ends of said sleeve, said gasket means being independent of said insulating member, and means movable relatively to said gasket means for compressing said gasket means.

2. An insulating lock coupling for unthreaded tubing and the like comprising, in combination, a tubular sleeve having threaded ends defining tube apertures, a central annular rib extending inwardly from the walls of said sleeve, an annular insulating member positioned in said sleeve and enclosing said rib, said member being formed with an annular recess for reception of said rib and with a recess for receiving and enclosing the end of said tubing and having axial extensions each defining a gasket recess, resilient gasket means in the ends of said sleeve, said gasket means being independent of said insulating member, and means movable relatively to said gasket means for compressing said gasket means.

3. An insulating lock coupling for unthreaded tubing having flared ends and the like comprising, in combination, a tubular sleeve having threaded ends defining tube apertures, a central annular rib extending inwardly from the walls of said sleeve, an annular insulating member positioned in said sleeve and enclosing said rib, said member being formed with an annular recess for reception of said rib and having annular tapering recesses on each axial side thereof for receiving and enclosing the flared ends of the tubing to be coupled, resilient gasket means in the ends of said sleeve, said gasket means being independent of said insulating member, and means movable relatively to said gasket means for compressing said gasket means, said gasket means urging said flared ends axially into engagement with said member.

4. An insulating lock coupling for unthreaded tubing and the like comprising, in combination, a tubular sleeve having threaded ends defining tube apertures, a central annular rib extending inwardly from the walls of said sleeve and substantially centrally thereof, the walls of said sleeve between said rib and said tube apertures being substantially cylindrical, an annular insulating member positioned in said sleeve and enclosing said rib, said member being formed with an annular recess for reception of said rib and with a recess for receiving and enclosing the end of said tubing, resilient gasket means in the ends of said sleeve, said gasket means being independent of said insulating member, follower nuts threadedly engageable with the threaded ends of said tubular sleeve and movable relatively to said gasket means for compressing said gasket means, and insulating sleeve means extending through each tube aperture for preventing contact between said follower nuts and the tubing to be coupled.

5. An insulating lock coupling for unthreaded tubing having flared ends and the like comprising, in combination, a tubular sleeve having threaded ends defining tube apertures, a central annular rib extending inwardly from the walls of said sleeve and substantially centrally thereof, the walls of said sleeve between said rib and said tube apertures being substantially cylindrical, an annular insulating member positioned in said sleeve and enclosing said rib, said member being formed with an annular recess for reception of said rib and having annular tapering recesses on each axial side thereof for receiving and enclosing the flared ends of the tubing to be coupled, resilient gasket means in the ends of said sleeve, said gasket means being independent of said insulating member, and said gasket means being formed with outwardly-extending sleeve portions adapted to enclose the tubing, and follower nuts threadedly engageable with said tubular sleeve and movable relatively to said gasket means for compressing said gasket means, said gasket means urging said flared ends axially into engagement with said member.

6. An insulating lock coupling for unthreaded tubing having flared ends and the like comprising, in combination, a tubular sleeve having threaded ends defining tube apertures, a central annular rib extending inwardly from the walls of said sleeve and substantially centrally thereof, the walls of said sleeve between said rib and said tube apertures being substantially cylindrical, an annular insulating member positioned in said sleeve and enclosing said rib, said member being formed with an annular recess for reception of said rib and having annular tapering recesses on each axial side thereof for receiving and enclosing the flared ends of the tubing to be coupled and defining axial extensions lying on each side of the rib, resilient gasket means in the ends of said sleeve, said gasket means being independent of said insulating member, and follower nuts threadedly engageable with said tubular sleeve and movable relatively to said gasket means for compressing said gasket means, said gasket means urging said flared ends axially into engagement with said member.

7. In a tubing line, a pair of unthreaded tubing sections having flared ends, a tubular sleeve enclosing the ends of said tubing sections and having threaded ends defining tube apertures, a central rib extending inwardly from the walls of said sleeve and substantially centrally thereof, the walls of said sleeve between said rib and said tube apertures being substantially cylindrical, an insulating annular member positioned between said tubing sections and enclosing said rib, said member being formed with an annular recess for reception of said rib and having annular tapering recesses on each axial side thereof in which the flared ends of the tubing are received and enclosed, gasket means in the ends of said sleeve in fluid-tight sealing engagement with said tubing sections, said gasket means being independent of said insulating member, and follower nuts threadedly engaged with said tubular sleeve and movable relatively to said gasket means for holding said gasket means in compressed engagement with the tubing, said gasket means urging said flared ends axially into engagement with said member.

8. In a tubing line, a pair of unthreaded tubing sections having flared ends, a tubular sleeve enclosing the ends of said tubing sections and having threaded ends defining tube apertures, a central annular rib extending inwardly from the walls of said sleeve and substantially centrally thereof, the walls of said sleeve between said rib and said tube apertures being substantially cylindrical, an insulating annular member of substantially trapezoidal cross-section positioned between said tubing sections and enclosing said rib, said member being formed with an annular recess for reception of said rib and having annular tapering recesses on each axial side thereof in which the flared ends of the tubing are received and enclosed, resilient gasket means in the ends of said sleeve in fluid-tight sealing engagement with said tubing sections, said gasket means being independent of said insulating member, and said gasket means being formed with outwardly-extending sleeve portions enclosing the tubing, and follower nuts threadedly engaged with said tubular sleeve and movable relatively to said gasket means for holding said gasket means in compressed engagement with the tubing, said gasket means urging said flared ends axially into engagement with said member.

FREDERICK T. NEWELL.

References Cited in the file of this patent

UNITED STATES PATENTS

| Number | Name | Date |
| --- | --- | --- |
| 1,783,410 | Cowell | Dec. 2, 1930 |
| 2,148,036 | Pfefferle | Feb. 21, 1939 |
| 2,278,479 | Parker | Apr. 7, 1942 |

FOREIGN PATENTS

| Number | Country | Date |
| --- | --- | --- |
| 438,262 | Great Britain | Nov. 13, 1935 |